US005450273A

United States Patent [19]

Boy

[11] Patent Number: 5,450,273

[45] Date of Patent: Sep. 12, 1995

[54] ENCAPSULATED SPARK GAP AND METHOD OF MANUFACTURING

[75] Inventor: Jürgen Boy, Berlin, Germany

[73] Assignee: Siemens Aktiengesellschaft, München, Germany

[21] Appl. No.: 141,831

[22] Filed: Oct. 22, 1993

[30] Foreign Application Priority Data

Oct. 22, 1992 [DE] Germany ........................ 42 36 538.4

[51] Int. Cl.$^{6}$ .......................... H02H 1/04; H02H 3/22

[52] U.S. Cl. .................................... 361/129; 361/120; 337/29

[58] Field of Search ........................ 361/120, 129, 130; 337/28, 29

[56] References Cited

U.S. PATENT DOCUMENTS 3,898,533 8/1975 Scudner, Jr. .......................... 317/61
4,366,412 12/1982 Lange et al. ........................ 313/325
4,912,592 3/1990 Flindall et al. ....................... 361/120
5,142,434 8/1992 Boy et al. ............................ 361/120
5,313,183 5/1994 Kasahara ............................. 361/129
5,388,023 2/1995 Boy et al. ............................ 361/129

FOREIGN PATENT DOCUMENTS 1280938 7/1972 United Kingdom .

*Primary Examiner*—Todd DeBoer
*Attorney, Agent, or Firm*—Kenyon & Kenyon

[57] ABSTRACT

In order to guarantee that the gas atmosphere of the structure of an encapsulated spark gap (9) is reliably protected from the effect of moisture, two flat discharge surfaces of two dish-type electrodes (1,6), each designed with a collar-shaped rim (2), abut on both sides of a thin insulating layer (4) having punched holes. A tubular glass insulator (3) is sealed on the front side into the collar-shaped rims of the two electrodes. During the course of their manufacturing, the electrodes are placed with their collar-shaped rim on the front sides of the glass insulator, are inductively heated and, under the action of an axially directed pressing force, are driven toward one another and pressed against the insulating layer. A spark gap of this type can be used as a secondary discharge gap for triple-electrode arresters.

10 Claims, 2 Drawing Sheets

ENCAPSULATED SPARK GAP AND METHOD OF MANUFACTURING

BACKGROUND OF THE INVENTION

The present invention relates to the field of electrical components, and its application is the structural development of encapsulated spark gaps used to divert overvoltages. These types of spark gaps are used, in particular, in combination with gas-filled overvoltage surge arresters, the encapsulated spark gap being electrically shunt-connected to the gas-filled overvoltage surge arrester and designed as a rule as a spark gap in air.

In the case of an encapsulated spark gap for diverting overvoltages, two circular-shaped, copper-containing electrodes mutually oppose each other and are insulated from one another by means of special range spacers, as well as through the interposition of a thin insulating layer of mica, glass or ceramic. The insulating layer is provided with a circular recess in the area of the mutually opposing electrode surfaces, so that an air gap or a gas gap exists between the electrodes. The two electrodes, whose electrode surfaces are coated with graphite or carbon, are joined to one another so as to be hermetically sealed in the outer area. For this purpose, inter alia, a tubular insulator consisting of ceramic, glass or plastic can be used, which is connected in a vacuum-tight manner with the external surface areas of the electrodes (see U.S. Pat. No. 3,898,533, FIG. 3).

A non-encapsulated spark gap has been used in combination with a gas-filled overvoltage surge arrester in the case of which two electrodes abut on both sides of a ceramic disk having multiple punched holes. One of these electrodes is provided with knob-type elevations, which engage into the holes in the ceramic disk. The actual spark gap in air is formed in each case by one knob and the flat counter-electrode (see U.S. Pat. No. 4,366,412). For such spark gaps in air, a mica film has been used having multiple punched holes as a range spacer for the two electrodes (see U.S. Pat. No. 5,142,434).

Finally an arrangement may be used for a gas-filled triple-electrode overvoltage surge arrester, which consists of a central electrode, two hollow-cylindrical ceramic insulators, and two frontally arranged end electrodes, in the case of which a spark gap in air is allocated to each end electrode. This likewise non-encapsulated spark gap in air is formed by means of an end of a metal spring clip top that is arranged with clearance from the end electrode. The metal clip is secured to the central electrode. The required clearance from the end electrode is observed by means of a polyurethane-resin coating. It is applied as a very thin coating to the sharp edges and corners of the two ends of the metal clip (see U.S. Pat. No. 4,912,592).

In the manufacturing of gas-filled overvoltage surge arresters having a tubular insulator of glass, it is generally known to use dish-type electrodes, which are provided with a collar-shaped rim and consist of a nickel-iron or rather a nickel-iron-cobalt alloy, and to join these electrodes to the glass insulator by fusing the ends of the glass insulator in a vacuum-tight manner (see German Patent Document No. 19 51 601 and GB Patent No. 1,280,938).

SUMMARY OF THE INVENTION

The present invention simplifies the structural design of an encapsulated spark gap for diverting overvoltages and, given a simple manufacturing, guarantees that the gas atmosphere of the spark gap is reliably protected from the external effects of moisture. To the extent that is possible, the spark gap should be capable of being shunted in a simple manner to a gas-filled overvoltage surge arrester as a secondary discharge path.

The present invention provides for the electrodes to have a dish-type design with a collar-shaped rim, and for the electrodes to abut with the electrode surfaces on both sides of the thin insulating layer, and for the glass insulator to be sealed on the front side into the collar-shaped rim of the electrodes.

In an arrangement of this type, the spark gap essentially consists of two simply shaped, similarly designed electrodes and of an interposed thin insulating layer. The electrodes enclose the thin insulating layer between them and are connected in a vacuum-tight manner by means of a tubular glass insulator. One can thus rule out with certainty that the discharge spaces of the spark gap formed by one or several holes in the thin insulating layer can have their physical properties altered by the ingression of moisture. This guarantees, in turn, that not only the d.c. sparkover voltage of the spark gap, but also its impulse sparkover voltage is kept constant over long operating periods.

In the manufacturing of the spark gap, it must be guaranteed that the two electrodes and the glass insulator are joined together to be hermetically sealed under the effect of heat and the subsequent cooling. This manufacturing can be achieved simply by first positioning the glass insulator in the collar-shaped rim of the one electrode, and by placing the thin insulating layer on the electrode surface of this electrode. After that, the other electrode with its collar-shaped rim is placed on the free-standing front end of the glass insulator, and the two front ends of the glass insulator are subsequently fused on by inductively heating the two electrodes in a gas atmosphere of nitrogen or in a nitrogen-air mixture. The two electrodes are pressed against the insulating layer under the effect of an axially directed pressing force. This guarantees a force-locking connection between the two electrodes and the thin insulating layer, and thus a defined electrode clearance, while eliminating all mechanical tolerances, because the glass insulator is fused on the front side. By applying a gas atmosphere of nitrogen or of a nitrogen-air mixture at a pressure above atmosphere or at a partial vacuum, the desired igniting voltage of the spark gap is able to be adjusted, for example an igniting voltage of $750 \pm 150$ volts at a pressure above atmosphere of a nitrogen-air mixture (air concentration 1–10%) of about 2 bar.

The described manufacturing of the spark gap is associated with considerable reliability from a standpoint of production engineering, when the electrodes consist of an iron-nickel-chromium alloy, and when the glass insulator consists of a soft sealing glass having a transformation point of between 450° C. and 550° C., preferably of about 515° C. These boundary conditions guarantee an excellent wetting of the top surfaces of the electrodes with the fused-on glass. This is guaranteed, inter alia, by a chromium content of about 1%.

Taking into consideration the fusing-in temperature required for the hermetically sealed connection, a mica film is particularly suited as a thin insulating layer. However, as a thin insulating layer, one can also have a ceramic film or also a ceramic layer that is applied to the electrode as a chemical coating out of the gaseous phase.

To equip a generally known triple-electrode overvoltage surge arrester with shunted spark gaps designed in accordance with the present invention, one expediently proceeds by axially placing a spark gap designed in accordance with the present invention on each end electrode and retaining it there by means of a two-armed, metal spring clip top, which is secured to the central electrode and whose resilient ends each abut on one electrode of a spark gap. The spark gaps are expediently centered on the arrester in this case, in that the end electrodes arranged on the front side have a recess for accommodating the particular spark gap.

BRIEF DESCRIPTION OF THE DRAWINGS

Two exemplified embodiments of the present invention are shown in FIG. 1 through FIG. 3. Other features and advantages of the present invention will become apparent from the following description taken in conjunction with the attached drawings.

DETAILED DESCRIPTION

Figure 1:
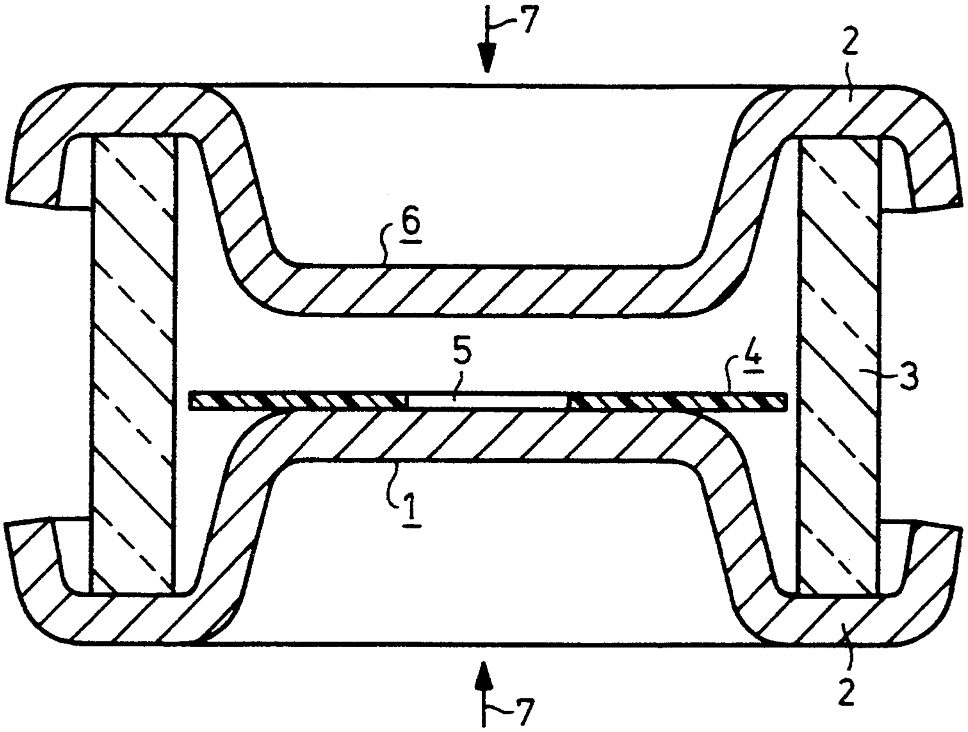
FIG. 1 illustrates a spark gap in the state before the electrodes are connected in a vacuum-tight manner to the glass insulator.

FIG. 1 illustrates a spark gap in the pre-assembled state, in which case a bottom electrode 1 is initially mounted which has a dish-type or platform-type design with a collar-shaped rim 2. A tubular glass insulator 3 is placed in the collar-shaped rim 2. Furthermore, an insulating film 4 in the form of a 60 to 70 μm-thick mica film which is provided with a central circular perforation 5 is placed on the discharge surface of the bottom electrode 1. The outer diameter of this likewise circular insulating film is selected to be slightly smaller than the inner diameter of the glass insulator 3.

The top electrode 6, whose shape is identical to the bottom electrode 1, is placed on the glass insulator 3. Because of the height of the glass insulator 3, a certain clearance is observed between the discharge surfaces of the two electrodes 1 and 6.

Figure 2:
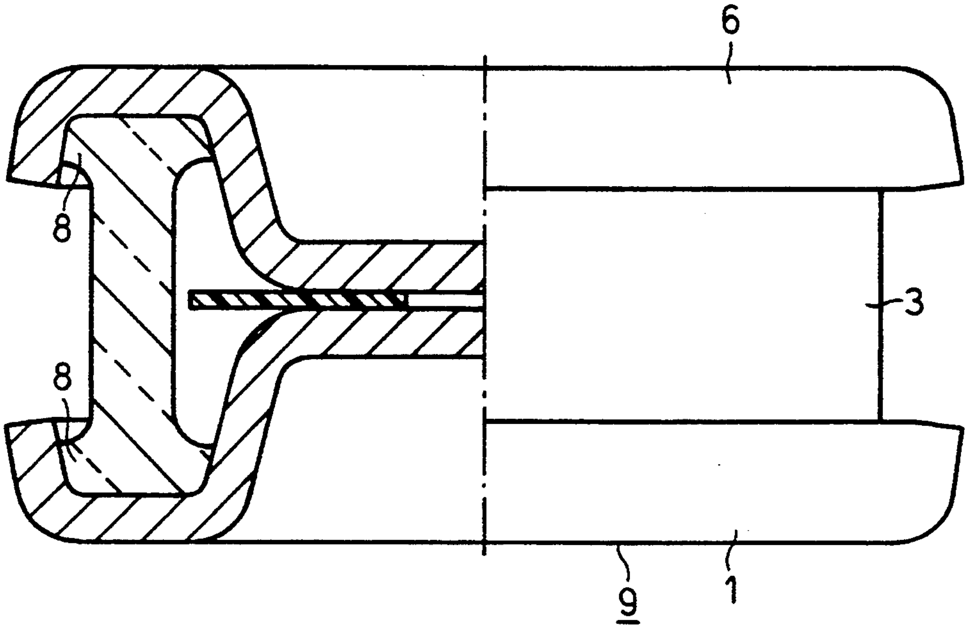
FIG. 2 illustrates the pre-manufactured spark gap.

To manufacture the desired discharge path between the two electrodes 1 and 6 and to encapsulate this discharge path to seal it hermetically, the arrangement depicted in FIG. 1 is placed in a receptacle that is capable of being evacuated. After evacuation, this receptacle is filled with nitrogen or with a mixture of air and nitrogen, a pressure of about 2000 mbar being adjusted thereby. The two electrodes 1 and 6 are then heated inductively until the glass insulator 3 softens on both of its front sides that are contacted by the electrodes. In this case, an axial pressing force is exerted on both electrodes 1 and 6 in accordance with the two arrows 7. Under the action of this pressing force, the electrodes 1 and 6 are driven toward one another, the front-side ends of the glass insulator 3 becoming deformed (8) thereby and becoming tightly bonded to the collar-shaped area of the electrodes through known chemical processes. The process of deforming the front-side ends of the glass insulator is complete when the discharge surfaces of the two electrodes 1 and 6 abut on both sides of the insulating film, as shown in FIG. 2. After the thus manufactured arrangement has cooled off, the result is a hermetically sealed, encapsulated spark gap, whose static and dynamic igniting voltage values lie between about 600 and 1000 volts.

To guarantee an excellent electrical contacting capability of the electrodes 1 and 6 for the operation of the spark gap, its outer surface can be nickel-plated after the spark gap is manufactured.

Figure 3:
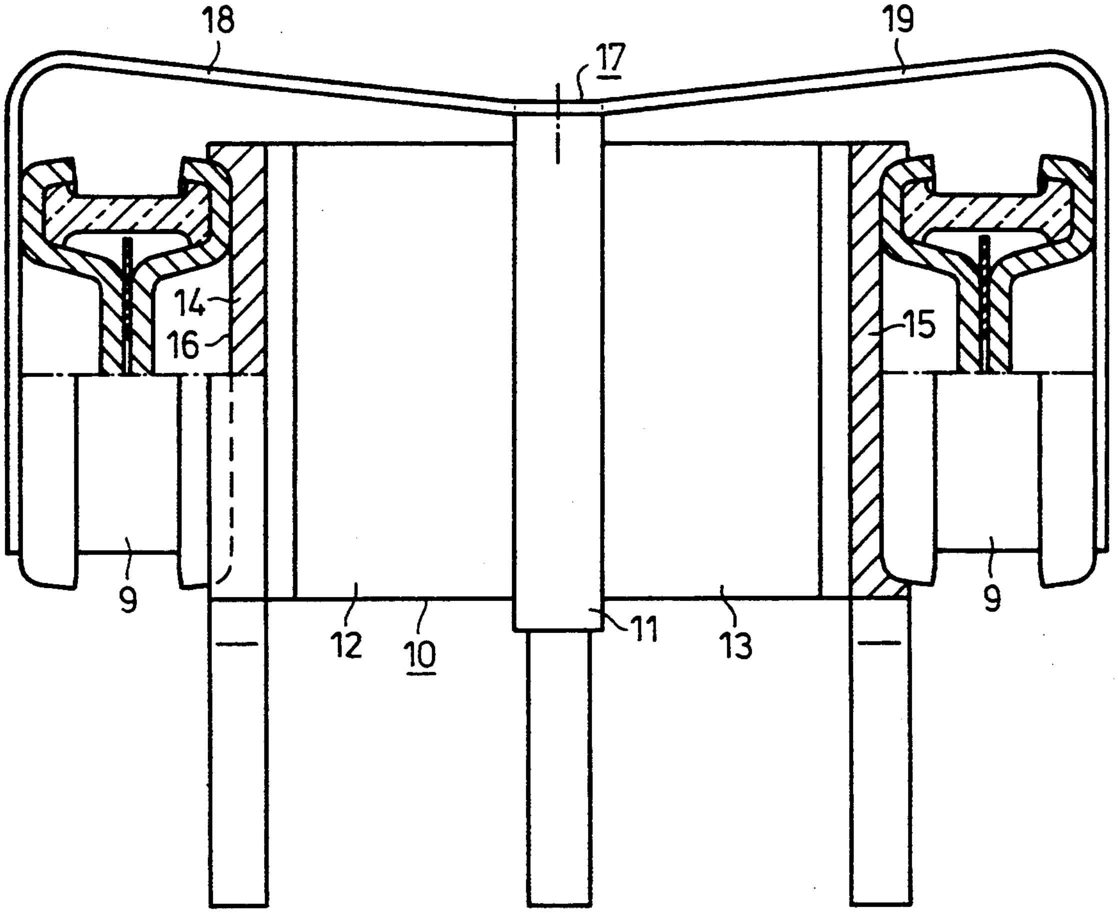
FIG. 3 illustrates a triple-electrode arrester having two shunted spark gaps in accordance with FIG. 2.

FIG. 3 depicts a triple-electrode arrester 10, which consists of a central electrode 11, two tubular ceramic insulators 12 and 13 and two end electrodes 14 and 15. A two-armed spring clip top 17, whose arms 18 and 19 contact two spark gaps 9 designed in accordance with FIG. 2 and are fixed in position on the front sides of the triple-electrode arrester, is secured to the central electrode 11. The electrode of each spark gap turned toward the triple-electrode arrester engages into a depression 16 in the end electrode 14 or 15 to provide a radial centering.

What is claimed is:

1. An encapsulated spark gap for diverting overvoltages, comprising:

two electrodes having a dish-type design with a collar-shaped rim and flat electrode surfaces;

a hollow-cylindrical glass insulator joining said two electrodes in an outer area of said two electrodes in a gas-tight manner; and a thin insulating layer having punched holes and maintaining a distance between said flat electrode surfaces;

wherein said two electrodes abut with said fiat electrode surfaces on both sides of the thin insulating layer; and wherein the hollow-cylindrical glass insulator is sealed on a front side into the collar-shaped rim of the electrodes.

2. The encapsulated spark gap according to claim 1, wherein the two electrodes comprise an iron-nickel-chromium alloy and the glass insulator comprises a soft sealing glass having a transformation point of between 450° C. and 550° C.

3. The encapsulated spark gap according to claim 1, wherein the thin insulating layer comprises a mica film.

4. The encapsulated spark gap according to claim 2, wherein the thin insulating layer comprises a mica film.

5. The encapsulated spark gap according to claim 1, wherein the thin insulating layer comprises a ceramic film.

6. The encapsulated spark gap according to claim 2, wherein the thin insulating layer comprises a ceramic film.

7. A gas-filled triple-electrode overvoltage surge arrestor, comprising:

a central electrode;

two frontally arranged end electrodes;

two hollow-cylindrical ceramic insulators each disposed between said central electrode and a corresponding one of said two frontally arranged end electrodes;

a two-armed metal spring clip top secured to the central electrode and having resilient ends which abut on the two frontally arranged end electrodes; and two shunted spark gaps, each of said two shunted spark gaps placed axially on a corresponding one of said two frontally arranged end electrodes, wherein said two shunted spark gaps are retained in place by said two-armed metal spring clip top, the resilient ends of said two-armed metal spring clip top each abutting on one electrode of the corresponding one of the two shunted spark gaps.

8. The gas-filled triple-electrode overvoltage surge arrestor according to claim 7, wherein each of said two shunted spark gaps comprises:

two electrodes having a dish-type design with a collar-shaped rim and flat electrode surfaces;

a hollow-cylindrical glass insulator joining said two electrodes in an outer area of said two electrodes in a gas-tight manner; and a thin insulating layer having punched holes and maintaining a distance between said flat electrode surfaces;

wherein said two electrodes abut with said flat electrode surfaces on both sides of the thin insulating layer; and wherein the hollow-cylindrical glass insulator is sealed on a front side into the collar-shaped rim of the electrodes.

9. The gas-filled triple-electrode overvoltage surge arrester according to claim 7, wherein the two end electrodes arranged on the front side each have a recess for accommodating the corresponding spark gap.

10. The gas-filled triple electrode overvoltage surge arrester according to claim 8, wherein the two end electrodes arranged on the front side each have a recess for accommodating the corresponding spark gap.

* * * * *